(12) United States Patent
Sazawa et al.

(10) Patent No.: US 9,172,654 B2
(45) Date of Patent: Oct. 27, 2015

(54) TRANSFER DEVICE AND TRANSFER METHOD

(71) Applicant: FUJITSU LIMITED, Kawasaki-shi, Kanagawa (JP)

(72) Inventors: Shinichi Sazawa, Atsugi (JP); Yuichi Sato, Yamato (JP); Hiroaki Kameyama, Kawasaki (JP); Daichi Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 123 days.

(21) Appl. No.: 13/935,432

(22) Filed: Jul. 3, 2013

(65) Prior Publication Data
US 2014/0071993 A1    Mar. 13, 2014

(30) Foreign Application Priority Data
Sep. 11, 2012  (JP) ................. 2012-199858

(51) Int. Cl.
*H04L 12/56* (2006.01)
*H04L 12/863* (2013.01)
*H04L 1/16* (2006.01)
*H04L 1/00* (2006.01)
*H04L 1/18* (2006.01)

(52) U.S. Cl.
CPC .............. *H04L 47/54* (2013.01); *H04L 1/1642* (2013.01); *H04L 1/1867* (2013.01); *H04L 1/0083* (2013.01); *H04L 1/1838* (2013.01)

(58) Field of Classification Search
USPC ......... 370/509, 510, 512, 252, 324, 349, 394, 370/471; 714/746; 348/E7.081, 14.15; 358/405, 439; 375/E7.016, E7.148, 375/E7.174, E7.181, E7.211, E7.224, 375/E7.277, E7.279
See application file for complete search history.

(56) References Cited

U.S. PATENT DOCUMENTS

| | | | |
|---|---|---|---|
| 5,872,777 A | 2/1999 | Brailean et al. | |
| 2002/0071421 A1* | 6/2002 | Chiu et al. | 370/349 |
| 2008/0175155 A1 | 7/2008 | Agarwal | |
| 2012/0134362 A1* | 5/2012 | Itagaki et al. | 370/394 |

FOREIGN PATENT DOCUMENTS

| | | |
|---|---|---|
| EP | 1263159 A1 | 12/2002 |
| JP | 2008-141633 | 6/2008 |

OTHER PUBLICATIONS

Extended European Search Report of EP Patent Application 13174461.7 mailed Mar. 18, 2014.

* cited by examiner

*Primary Examiner* — Phuongchau Ba Nguyen
(74) *Attorney, Agent, or Firm* — Fujitsu Patent Center

(57) ABSTRACT

A transfer device increments a value of a phase ID at predetermined time intervals, and registers a packet ID of a transmitted data packet and a phase ID on a determination table in an associated manner. When having received a response packet from a receiving-side transfer device, the transfer device determines an unarrived packet on the basis of received packet IDs contained in the received response packet and packet IDs of transmitted data packets. Then, the transfer device determines whether a data packet corresponding to the unarrived packet is lost or on-the-fly from a relationship between a phase ID of the unarrived packet and the maximum phase contained in the received response packet, and retransmits the corresponding data packet only if it is lost.

6 Claims, 12 Drawing Sheets

FIG.5

| PACKET ID | PHASE ID |
|---|---|
| 1 | 1 |
| 2 | 1 |
| 3 | 2 |
| 4 | 2 |
| ... | ... |
| 5001 | 344 |
| 5002 | 344 |
| 5003 | 344 |
| ... | ... |

| PACKET ID | DATA OF DATA PACKET | TRANSMISSION FLAG |
|---|---|---|
| 1 | DATA OF DATA PACKET WITH PACKET ID "1" | ON |
| 2 | DATA OF DATA PACKET WITH PACKET ID "2" | ON |
| 3 | DATA OF DATA PACKET WITH PACKET ID "3" | ON |
| 4 | DATA OF DATA PACKET WITH PACKET ID "4" | ON |

120b

TRANSFER DEVICE AND TRANSFER METHOD

CROSS-REFERENCE TO RELATED APPLICATION

This application is based upon and claims the benefit of priority of the prior Japanese Patent Application No. 2012-199858, filed on Sep. 11, 2012, the entire contents of which are incorporated herein by reference.

FIELD

The embodiment discussed herein is related to a transfer device and the like.

BACKGROUND

In recent years, the network bandwidth has been increasingly expanded with the spread of optical communications and the like. However, as explained below, the network bandwidth is not effectively used due to the influence of network delay.

A conventional transfer device executes packet transmission by a TCP (Transmission Control Protocol). In the TCP, a receive window size is set, and after transmission of packets equivalent to the receive window size, whether each of the packets has arrived at a destination is determined by receipt of an ACK (Acknowledge) from the destination. After having confirmed the arrival of the packet, the transfer device transmits the next packet.

FIG. 12 is a diagram for explaining the conventional technology. As illustrated in FIG. 12, a transmitting-side transfer device transmits packets 1a equivalent to a receive window size to a receiving-side transfer device, and receives an ACK 1b from the receiving side. By the receipt of the ACK 1b, the transmitting-side transfer device confirms that the packet 1a has arrived at a destination, and transmits the next packet 1c to the receiving-side transfer device. A time between the transmission of the packets 1a and the receipt of the ACK 1b is called an RTT (Round Trip Time).

A standard data amount of the receive window size used in the TCP is 64 KB. When an RTT is X (ms), data in the amount of 64 KB×(1000/X) only can be transmitted per second. For example, when an RTT is 200 (ms), an amount of data that can be transmitted per second is 2.56 (Mbps). That is, when the receive window size is 64 KB, and the RTT is 200 (ms), a transmittable data amount is 2.56 (Mbps) no matter how wide the network bandwidth is.

To resolve the above-described problem, there are various conventional technologies. A conventional technology 1 is designed to enlarge a receive window size by TCP scale option, thereby increasing an amount of data to be transmitted at one time. Then, in the conventional technology 1, after transmission of a packet, if no ACK is received within a response delay time set on the basis of regular measurement, the packet is considered to be lost, and the packet is retransmitted.

FIG. 13 is a diagram for explaining the conventional technology 1. As illustrated in FIG. 13, a transfer device according to the conventional technology 1 transmits a packet 2a to the receiving side, and, when having received an ACK 2b of the packet 2a within a response delay time 3a, determines that the packet 2a has arrived at the receiving side. On the other hand, the transfer device transmits a packet 2c to the receiving side, and, when having received no ACK of the packet 2c within a response delay time 3b, considers the packet 2c to be lost and retransmits a packet 2d corresponding to the packet 2c.

In a conventional technology 2, a packet-transmitting-side transfer device transmits packets in ascending order of packet ID. Then, a packet-receiving-side transfer device monitors the order of packet IDs of received packets, and, if any packet ID is missing, requests for retransmission of a corresponding packet.

FIG. 14 is a diagram for explaining the conventional technology 2. As illustrated in FIG. 14, in the conventional technology 2, the transmitting-side transfer device transmits packets 4a, 4b, 4c, 4d, and 4e in this order to the receiving-side transfer device. Packet IDs of the packets 4a, 4b, 4c, 4d, and 4e are 1, 2, 3, 4, and 5, respectively. The receiving-side transfer device receives the packets 4a, 4b, 4c, and 4e. The receiving-side transfer device monitors packet IDs of the packets 4a, 4b, 4c, and 4e, and detects that packet ID "4" is missing. In this case, the receiving-side transfer device transmits a retransmission request packet 5a to the transmitting-side transfer device. The retransmission request packet 5a contains a packet ID of a packet to be retransmitted. The transmitting-side transfer device transmits the packet 4d requested to be retransmitted to the receiving-side transfer device. These related-art examples are described, for example in [Patent document 1] Japanese Laid-open Patent Publication No. 2008-141633.

However, the above-described conventional technologies have a problem that to perform data transfer in the utmost limit of the network bandwidth, the receive window size has to be increased, and it is not possible to prevent wasteful retransmission.

For example, in the above-described conventional technology 1, if no ACK is received within the response delay time, a packet is considered to be lost, and the packet is retransmitted. However, an increase in the load on a network may delay the arrival of a packet, and an ACK does not arrive at the transmitting-side transfer device within the response delay time. In such a case, retransmission performed by the transmitting side is wasteful retransmission. A packet which has been transmitted from the transmitting-side transfer device but has not arrived at the receiving-side transfer device is called a packet on-the-fly.

In the above-described conventional technology 2, the receiving-side transfer device monitors the order of packet IDs, detects a missing packet, and requests for retransmission of the packet. However, in this conventional technology 2, to detect loss of a retransmitted packet, a response delay time has to be set in the same manner as the conventional technology 1. FIG. 15 is a diagram for explaining the problem in the conventional technology 2. As illustrated in FIG. 15, in the first transmission of packets, loss of the packet 4d can be detected as explained in FIG. 14; however, in retransmission of the packet 4d, it could be that the packet 4d is lost again. In this case, loss of the packet 4d isn't detected by the order of packet IDs of packets 4f and later. Namely, to detect loss of the retransmitted packet 4d, the transmitting-side transfer device has to set a response delay time and determine whether or not to transmit the retransmitted packet again.

One aspect of the present invention is intended to provide a transfer device, transfer method, and transfer program capable of preventing wasteful retransmission even when there are a lot of packets on-the-fly.

SUMMARY

According to an aspect of an embodiment, a transfer device includes a transmitting unit that sequentially transmits packets with assigned unique first identification numbers for identifying the packets to a destination, and sequentially transmits second identification numbers incremented at predetermined time intervals to the destination; a registering unit that registers a first identification number of a packet which has been transmitted by the transmitting unit and a second identification number at the point of time when the packet has been transmitted from the transmitting unit on a table in an associated manner; a determining unit that receives first identification numbers of packets having arrived at the destination and the latest second identification number having arrived at the destination, and determines a first identification number of a packet to be retransmitted to the destination on the basis of the first identification numbers of the packets having arrived at the destination, the latest second identification number having arrived at the destination, and the table; and a retransmitting unit that retransmits a packet on the basis of a result of determination by the determining unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a data structure of a determination table;

FIG. 6 is a diagram illustrating an example of a data structure of a packet management table;

DESCRIPTION OF EMBODIMENT

Preferred embodiments of the present invention will be explained with reference to accompanying drawings. Incidentally, the present invention is not limited to this embodiment.

Figure 1:
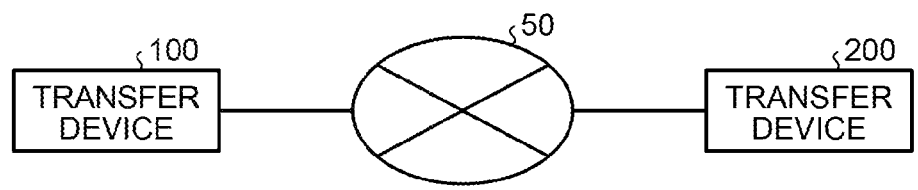
FIG. 1 is a diagram illustrating an example of a transfer system according to a present embodiment.

A configuration of a transfer system according to the present embodiment is explained. FIG. 1 is a diagram illustrating an example of the transfer system according to the present embodiment. As illustrated in FIG. 1, this transfer system includes transfer devices 100 and 200. The transfer devices 100 and 200 are interconnected via a network 50.

Figure 2:
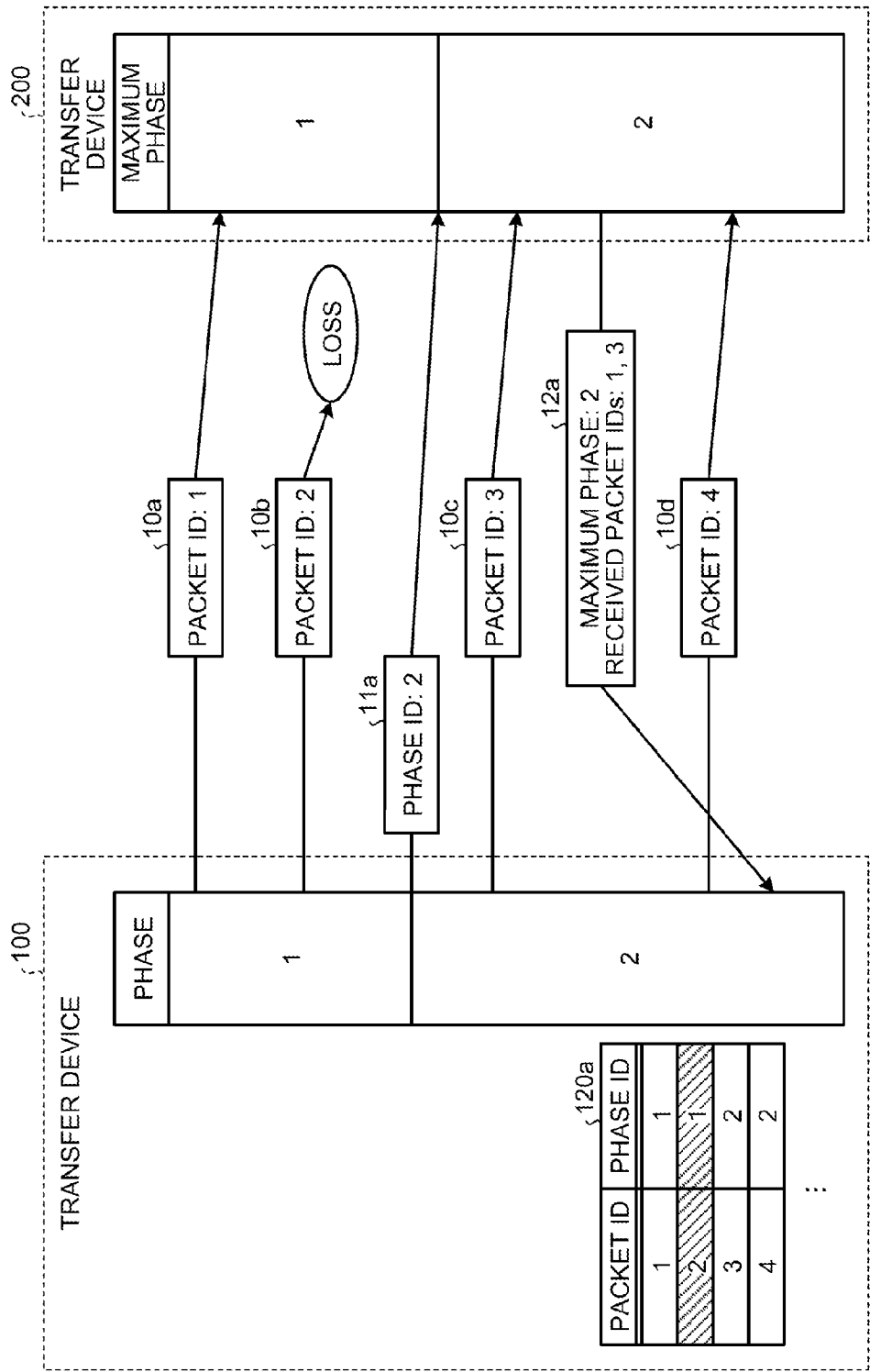
FIG. 2 is a diagram for explaining data communication performed in the transfer system.

Here, data communication performed in the transfer system according to the present embodiment is explained. FIG. 2 is a diagram for explaining the data communication performed in the transfer system. As an example, the transfer device 100 is the packet transmitting side, and the transfer device 200 is the packet receiving side. Furthermore, a transmit buffer size of the transfer device 100 is equal to or more than the bandwidth delay product. The bandwidth delay product is the product of a bandwidth of the network 50 and an RTT, and is set by an administrator in advance.

As illustrated in FIG. 2, the transfer device 100 assigns unique packet identifiers (IDs) for identifying data packets to the data packets, and sequentially transmits the data packets to the destination transfer device 200 in ascending order of packet ID. For example, the transfer device 100 transmits data packets in the order of a data packet 10a with packet ID "1", a data packet 10b with packet ID "2", a data packet 10c with packet ID "3", and a data packet 10d with packet ID "4".

The transfer device 100 manages a phase incremented at predetermined time intervals. Each time a value of the phase is updated, the transfer device 100 transmits a phase packet to the transfer device 200. The phase packet contains a phase ID indicating a value of the phase. In an example illustrated in FIG. 2, when a value of the phase has been changed from 1 to 2, the transfer device 100 transmits a phase packet 11a to the transfer device 200. The phase packet 11a contains phase ID "2". Incidentally, the transfer device 100 has already transmitted a phase packet containing phase ID "1" to the transfer device 200.

Incidentally, each time the transfer device 100 has transmitted a data packet, the transfer device 100 registers a phase ID at the point of time when the data packet has been transmitted and a packet ID of the data packet on a determination table 120a in an associated manner.

On the other hand, the transfer device 200 sequentially receives data packets and phase packets from the transfer device 100, and transmits a response packet to the transfer device 100 at predetermined time intervals. This response packet contains packet IDs of data packets received by the transfer device 200 and a value of the maximum phase. The packet IDs of the received data packets are hereinafter referred to as received packet IDs. The maximum phase corresponds to the maximum phase ID in phase IDs of the phase packets received by the transfer device 200.

For example, when having received the phase packet 11a, the transfer device 200 changes the maximum phase from 1 to 2. For example, the transfer device 200 receives the data packets 10a and 10c, and transmits a response packet 12a to the transfer device 100 before receiving the data packet 10d. Incidentally, loss of the data packet 10b has occurred before the data packet 10b arrives at the transfer device 200. In this case, the transfer device 200 transmits the response packet 12a containing the maximum phase "2" and received packet IDs "1, 3" to the transfer device 100.

After the transfer device 100 has transmitted the data packets 10a to 10d and the phase packet 11a to the transfer device 200, the transfer device 100 receives the response packet 12a. The transfer device 100 determines a packet ID of a data packet to be retransmitted to the transfer device 200 on the basis of the received packet IDs and maximum phase contained in the response packet 12a and the determination table 120a.

The transfer device 100 determines, out of packet IDs listed in the determination table 120a which correspond to phase IDs less than a value of the maximum phase, a packet ID different from any of the received packet IDs as a packet ID of a data packet to be retransmitted. In the case of receipt of the response packet 12a illustrated in FIG. 2, packet IDs corresponding to phase IDs less than the maximum phase "2" out of packet IDs listed in the determination table 120a are "1, 2". Furthermore, out of the packet IDs "1, 2", packet ID "2" is the one that is different from any of the received packet IDs "1, 3". Therefore, the transfer device 100 determines to transmit the data packet with packet ID "2" to the transfer device 200.

The transfer device 100 determines a packet ID of a packet to be retransmitted in accordance with the above-described procedure; therefore, it is possible to prevent wasteful retransmission in case of the existence of packets on-the-fly. In the example illustrated in FIG. 2, the packet 10d is in a state of on-the-fly, so if the packet 10d is retransmitted, it is wasteful retransmission; however, the transfer device 100 according to the present embodiment does not perform such wasteful retransmission.

Figure 3:
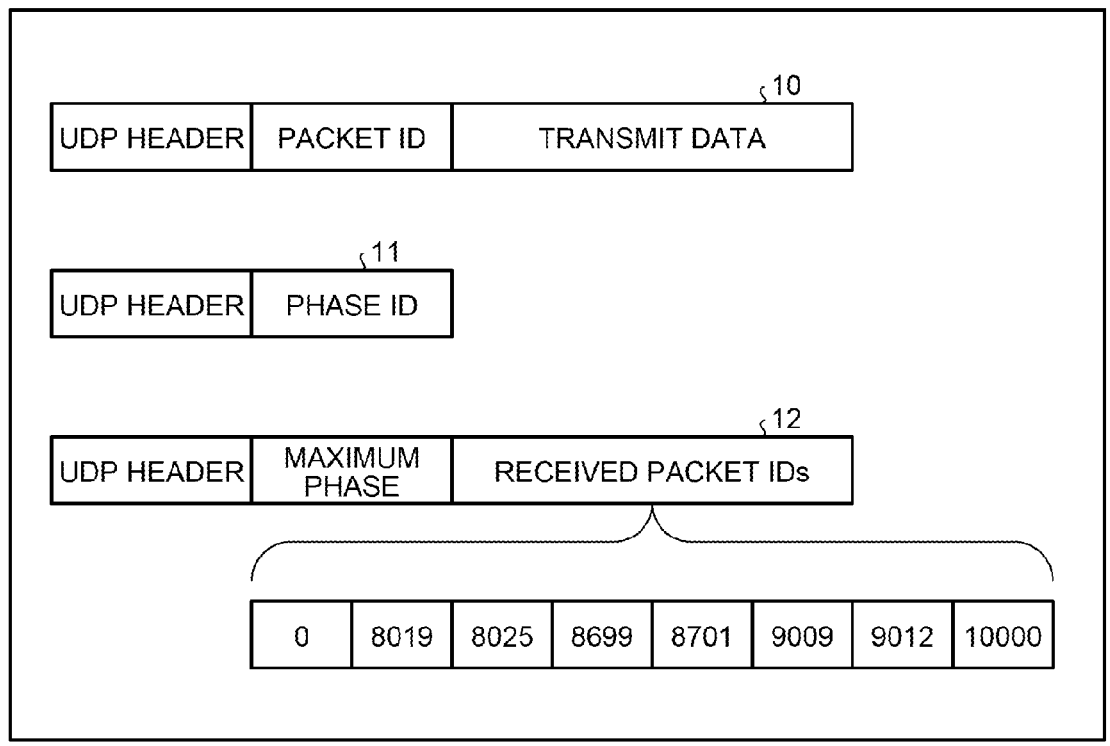
FIG. 3 is a diagram illustrating an example of respective data structures of packets.

Subsequently, an example of respective data structures of a data packet, phase packet, and response packet transmitted/received in FIG. 2 is explained. FIG. 3 is a diagram illustrating an example of the data structures of the packets. A packet 10 in FIG. 3 illustrates an example of the data structure of the data packet. A packet 11 illustrates an example of the data structure of the phase packet. A packet 12 illustrates an example of the data structure of the response packet.

The data packet 10 contains UDP (User Datagram Protocol) header, a packet ID, and transmit data. The transmit data is user data. The phase packet 11 contains UDP header and a phase ID. Incidentally, in the present embodiment, there is described an example where the UDP is used; however, not only the UDP but also other general communication protocols can be used.

The response packet 12 contains UDP header, the maximum phase, and received packet IDs. The received packet IDs contain information of packets IDs of data packets having arrived at the transfer device 200. The received packet IDs illustrated in FIG. 3 indicates that the transfer device 200 has received data packets with packet IDs 0 to 8019, 8025 to 8699, 8701 to 9009, and 9012 to 10000 out of packet IDs 0 to 10000. Namely, data packets with packet IDs 8020 to 8024, 8700, and 9010 to 9011 have not been received.

Figure 4:
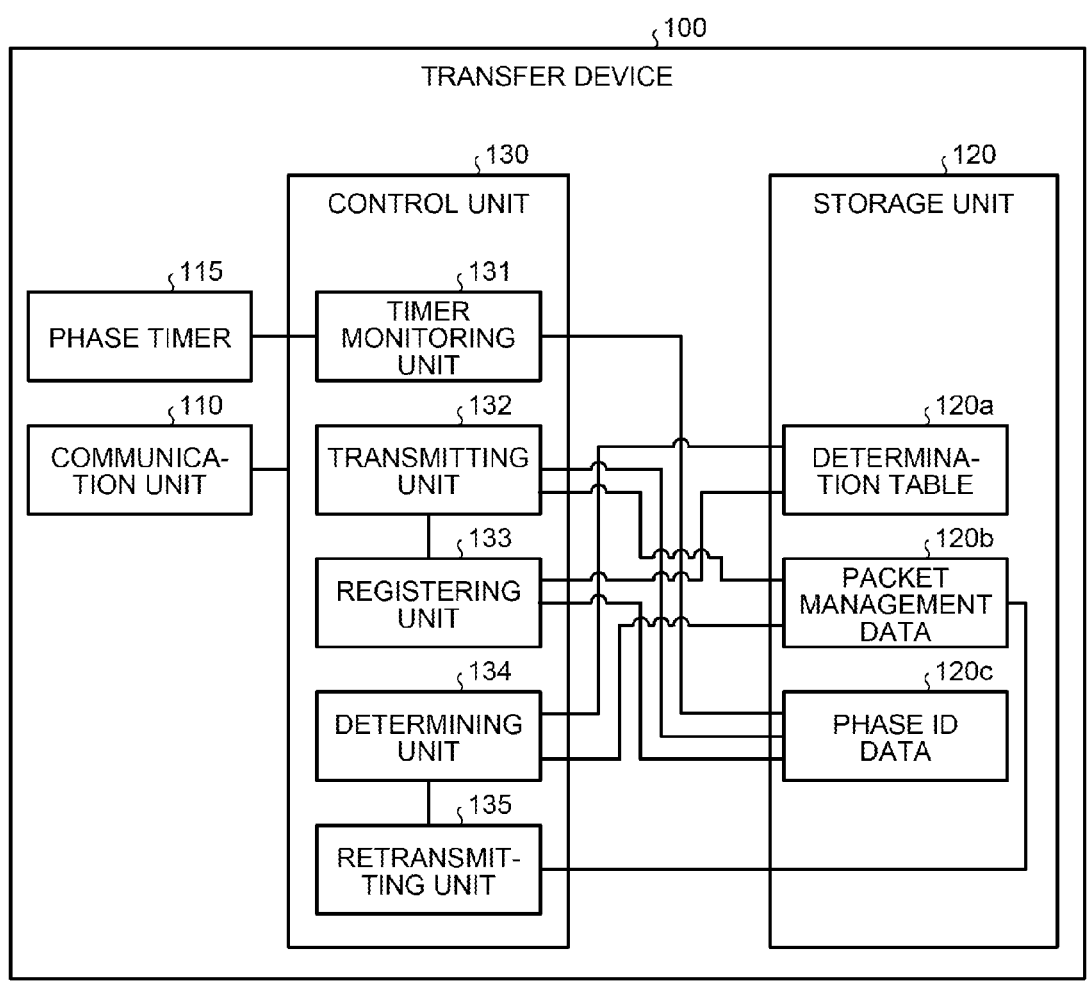
FIG. 4 is a functional block diagram illustrating a configuration of a transmitting-side transfer device according to the present embodiment.

Subsequently, a configuration of the transmitting-side transfer device 100 illustrated in FIGS. 1 and 2 is explained. FIG. 4 is a functional block diagram illustrating the configuration of the transmitting-side transfer device according to the present embodiment. As illustrated in FIG. 4, the transfer device 100 includes a communication unit 110, a phase timer 115, a storage unit 120, and a control unit 130.

The communication unit 110 is a processing unit that executes data communication with the transfer device 200 via the network 50. For example, the communication unit 110 corresponds to a communication device or the like. The control unit 130 to be described later exchanges data with the transfer device 200 via the communication unit 110.

The phase timer 115 is a timer that transmits a signal to the control unit 130 at predetermined time intervals. As described later, the phase timer 115 is a timer for measuring the timing to increment a value of phase ID data 120c.

The storage unit 120 is a storage unit that stores therein determination table 120a, packet management data 120b, and the phase ID data 120c. As explained in FIG. 2, the determination table 120a stores therein a packet ID and a phase ID in an associated manner. FIG. 5 is a diagram illustrating an example of a data structure of the determination table.

A packet management data 120b is a table that stores therein data packets. FIG. 6 is a diagram illustrating an example of a data structure of the packet management table. As illustrated in FIG. 6, the packet management table 120b holds therein a packet ID, data of a data packet corresponding to the packet ID, and a transmission flag in an associated manner. For example, packet ID "1" and data of a data packet with the packet ID "1" are recorded on the first line of the packet management table 120b. As explained in FIG. 3, each data packet contains UDP header, a packet ID, and transmit data. The transmission flag indicates whether a corresponding data packet has been transmitted to the transfer device 200. For example, when the transmission flag is ON, it indicates that a corresponding data packet has been transmitted; on the other hand, when the transmission flag is OFF, it indicates that a corresponding data packet has not yet been transmitted.

The phase ID data 120c holds therein a value of a phase ID. Incidentally, the initial value of the phase ID data 120c is 0.

The control unit 130 includes a timer monitoring unit 131, a transmitting unit 132, a registering unit 133, a determining unit 134, and a retransmitting unit 135.

The timer monitoring unit 131 is a processing unit that increments a value of the phase ID data 120c by a predetermined value each time the control unit 130 has received a signal from the phase timer 115. For example, each time the control unit 130 has received a signal from the phase timer 115, the timer monitoring unit 131 increments a value of the phase ID data 120c by one.

The transmitting unit 132 is a processing unit that performs a data-packet transmitting process and a phase-packet transmitting process.

The data-packet transmitting process performed by the transmitting unit 132 is explained. The transmitting unit 132 acquires data packets registered on the packet management data 120b, and sequentially transmits the data packets to the transfer device 200 in ascending order of packet ID. When having transmitted a data packet, the transmitting unit 132 notifies the registering unit 133 of a packet ID of the transmitted data packet. Furthermore, the transmitting unit 132 sets a transmission flag in the packet management data 120b corresponding to the transmitted data packet to ON.

The phase-packet transmitting process performed by the transmitting unit 132 is explained. The transmitting unit 132 monitors a value of the phase ID data 120c, and, each time the value of the phase ID data 120c has been incremented by one, the transmitting unit 132 generates a phase packet and transmits the phase packet to the transfer device 200. The transmitting unit 132 generates the phase packet by storing the incremented value of the phase ID data 120c in phase ID of the phase packet.

For example, when a value "1" of the phase ID data 120c has been incremented by one and becomes "2", the transmitting unit 132 generates a phase packet by storing "2" in phase ID thereof and transmits the generated phase packet to the transfer device 200.

The registering unit 133 is a processing unit that registers, when the transmitting unit 132 has transmitted a data packet, a packet ID of the data packet and a value of the phase ID data 120c at the point of time when the data packet has been transmitted on the determination table 120a in an associated manner. When the transmitting unit 132 has transmitted a data packet, the registering unit 133 acquires a packet ID of the data packet which has been transmitted from the transmitting unit 132.

The determining unit 134 is a processing unit that determines, when the transfer device 100 has received a response packet from the transfer device 200, a packet ID of a data packet to be retransmitted on the basis of the response packet and the determination table 120a. The determining unit 134 outputs the packet ID of the data packet to be retransmitted to the retransmitting unit 135.

A process performed by the determining unit 134 is explained concretely. First, the determining unit 134 determines an unarrived packet indicating a data packet which has not arrived at the transfer device 200. The determining unit 134 compares packet IDs of transmitted data packets out of those in the packet management data 120b with received packet IDs contained in a response packet, and identifies a packet ID which is different from any of the received packet IDs. The determining unit 134 determines a data packet corresponding to the identified packet ID as an unarrived packet. For example, when received packet IDs contain "1, 3", and packet IDs of transmitted data packets are "1, 2, 3", an unarrived packet is a data packet with packet ID "2".

After having determined the unarrived packet, the determining unit 134 determines whether or not to retransmit the unarrived packet. Specifically, the determining unit 134 identifies a phase ID corresponding to the unarrived packet from the determination table 120a, and, if a value of the phase ID corresponding to the unarrived packet is smaller than a value of the maximum phase contained in the response packet, determines to retransmit the unarrived packet. The determining unit 134 outputs a packet ID of the unarrived packet to be retransmitted to the retransmitting unit 135.

Incidentally, the determining unit 134 can be configured to learn received response packet IDs contained in a received packet and exclude the learned received packet IDs from candidate packet IDs of data packets to be retransmitted.

The retransmitting unit 135 is a processing unit that retransmits a data packet on the basis of a result of determination by the determining unit 134. Specifically, the retransmitting unit 135 acquires a packet ID from the determining unit 134, and detects a data packet corresponding to the acquired packet ID from the packet management data 120b. Then, the retransmitting unit 135 transmits the detected data packet to the transfer device 200.

Figure 7:
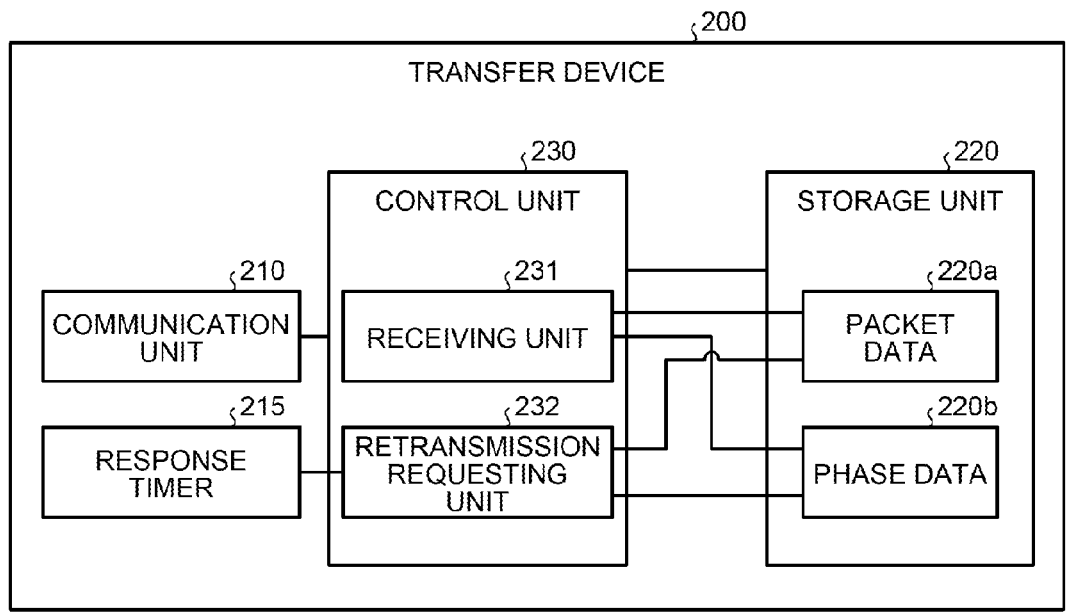
FIG. 7 is a functional block diagram illustrating a configuration of a receiving-side transfer device according to the present embodiment.

Subsequently, a configuration of the receiving-side transfer device 200 illustrated in FIGS. 1 and 2 is explained. FIG. 7 is a functional block diagram illustrating the configuration of the receiving-side transfer device according to the present embodiment. As illustrated in FIG. 7, the transfer device 200 includes a communication unit 210, a response timer 215, a storage unit 220, and a control unit 230.

The communication unit 210 is a processing unit that executes data communication with the transfer device 100 via the network 50. For example, the communication unit 210 corresponds to a communication device or the like. The control unit 230 to be described later exchanges data with the transfer device 100 via the communication unit 210.

The response timer 215 is a timer that transmits a signal to the control unit 230 at predetermined time intervals. As described later, the response timer 215 is for measuring the timing to transmit a response packet.

The storage unit 220 is a storage unit that stores therein packet data 220a and phase data 220b. The packet data 220a is data of data packets received from the transfer device 100. The phase data 220b stores therein a value of the maximum phase ID in phase IDs received from the transfer device 100.

The control unit 230 includes a receiving unit 231 and a retransmission requesting unit 232. The receiving unit 231 is a processing unit that receives data packets and phase packets from the transfer device 100. When having received a data packet from the transfer device 100, the receiving unit 231 registers the received data packet on the packet data 220a.

Furthermore, when having received a phase packet, the receiving unit 231 compares a value of a phase ID of the phase packet with a value of the phase data 220b. When the value of the phase ID of the phase packet is larger than the value of the phase data 220b, the receiving unit 231 updates the value of the phase data 220b with the value of the phase ID of the phase packet. On the other hand, when the value of the phase ID of the phase packet is equal to or smaller than the value of the phase data 220b, the receiving unit 231 does not update the value of the phase data 220b.

The retransmission requesting unit 232 is a processing unit that generates a response packet each time the control unit 230 has received a signal from the response timer 215 and transmits the response packet to the transfer device 100. The retransmission requesting unit 232 stores packet IDs stored in the packet data 220a as received packet IDs in the response packet. Furthermore, the retransmission requesting unit 232 stores a value of the phase data 220b as the maximum phase in the response packet. The retransmission requesting unit 232 transmits the response packet storing the received packet IDs and the maximum phase to the transfer device 100.

Figure 8:
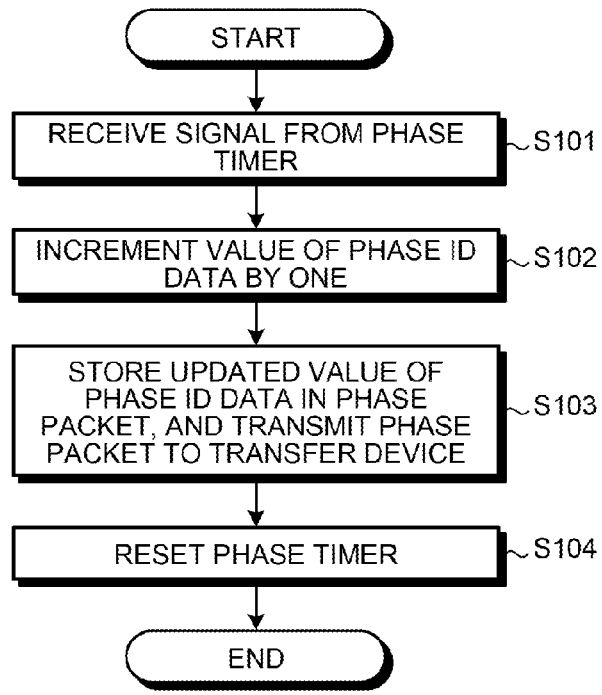
FIG. 8 is a flowchart illustrating a procedure of a phase-packet transmitting process performed by the transfer device according to the present embodiment.

Subsequently, a procedure of a phase-packet transmitting process performed by the transfer device 100 according to the present embodiment is explained. FIG. 8 is a flowchart illustrating the procedure of the phase-packet transmitting process performed by the transfer device according to the present embodiment. As illustrated in FIG. 8, the transfer device 100 receives a signal from the phase timer 115 (Step S101), and increments a value of the phase ID data 120c by one (Step S102).

The transfer device 100 stores the updated value of the phase ID data 120c in a phase packet, and transmits the phase packet to the transfer device 200 (Step S103). The transfer device 100 resets the phase timer 115 (Step S104).

Figure 9:
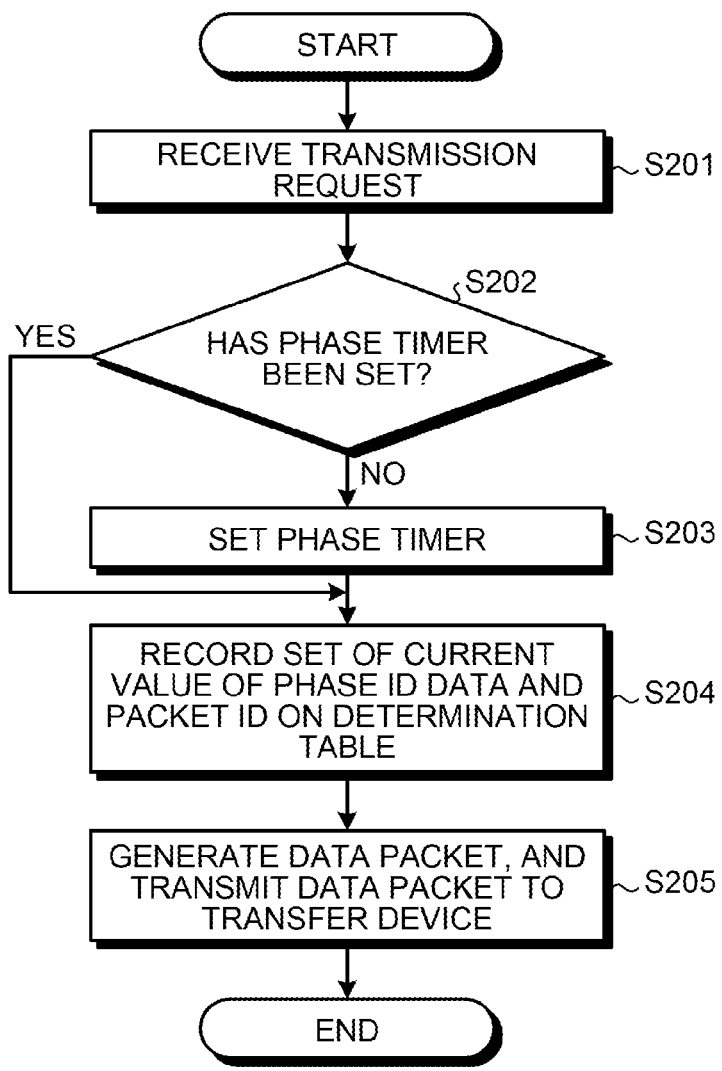
FIG. 9 is a flowchart illustrating a procedure of a data-packet transmitting process performed by the transfer device according to the present embodiment.

Subsequently, a procedure of a data-packet transmitting process performed by the transfer device 100 according to the present embodiment is explained. FIG. 9 is a flowchart illustrating the procedure of the data-packet transmitting process performed by the transfer device according to the present embodiment. For example, upon receipt of a transmission request, the transfer device 100 performs the process illustrated in FIG. 9. For example, the transfer device 100 receives the transmission request from a client or the like which requests the transfer device 100 to transmit a data packet.

As illustrated in FIG. 9, the transfer device 100 receives a transmission request (Step S201), and determines whether the phase timer 115 has been set (Step S202). When the phase timer has been set (YES at Step S202), the transfer device 100 moves onto Step S204.

On the other hand, when the phase timer 115 has not been set (NO at Step S202), the transfer device 100 sets the phase timer 115 (Step S203). The transfer device 100 records a set of a current value of the phase ID data 120c and a packet ID on the determination table 120a (Step S204).

The transfer device 100 generates a data packet, and transmits the data packet to the transfer device 200 (Step S205).

Figure 10:
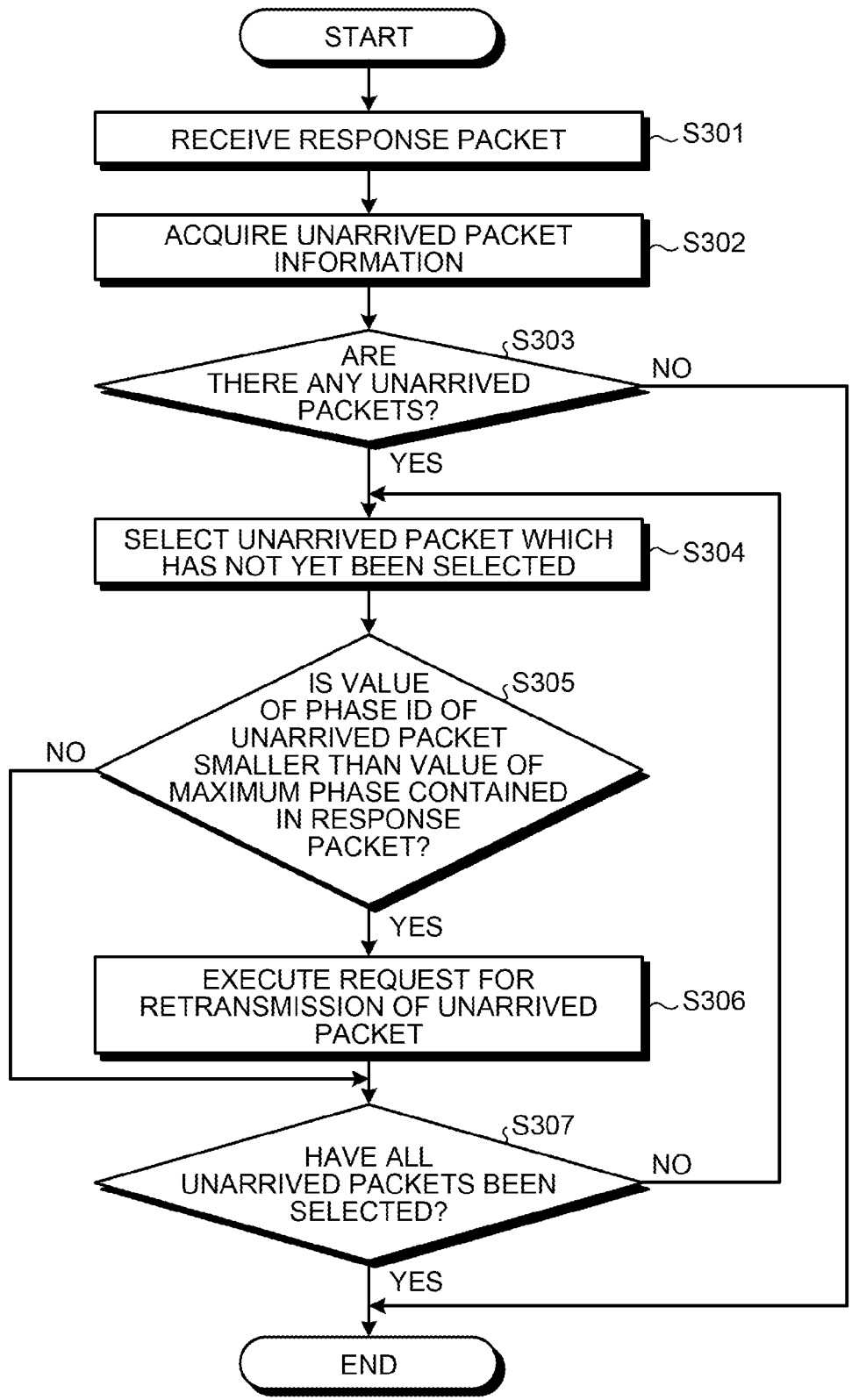
FIG. 10 is a flowchart illustrating a procedure of a process performed by the transfer device according to the present embodiment when having received a response packet.

Subsequently, a process performed by the transfer device 100 according to the present embodiment when having received a response packet from the transfer device 200 is explained. FIG. 10 is a flowchart illustrating a procedure of the process performed by the transfer device according to the present embodiment when having received a response packet.

As illustrated in FIG. 10, the transfer device 100 receives a response packet from the transfer device 200 (Step S301). The transfer device 100 acquires unarrived packet information from the response packet (Step S302).

The transfer device 100 determines whether there are any unarrived packets (Step S303). When there are no unarrived packets (NO at Step S303), the transfer device 100 ends the process.

When there are unarrived packets (YES at Step S303), the transfer device 100 selects an unarrived packet which has not yet been selected (Step S304). The transfer device 100 determines whether a value of a phase ID of the unarrived packet is smaller than a value of the maximum phase contained in the response packet (Step S305). When the value of the phase ID of the unarrived packet is equal to or larger than the value of the maximum phase contained in the response packet (NO at Step S305), the transfer device 100 moves onto Step S307.

On the other hand, when the value of the phase ID of the unarrived packet is smaller than the value of the maximum phase contained in the response packet (YES at Step S305), the transfer device 100 executes retransmission of the unarrived packet (Step S306).

The transfer device 100 determines whether all the unarrived packets have been selected (Step S307). When all the unarrived packets have not been selected (NO at Step S307), the transfer device 100 moves onto Step S304. On the other hand, when all the unarrived packets have been selected (YES at Step S307), the transfer device 100 ends the process. Incidentally, the transmission source device notifies the destination device of end of communication, and terminates the communication after having confirmed the arrival of the notification and the arrival of all packets to be transmitted.

Subsequently, advantages of the transfer device 100 according to the present embodiment are explained. The transfer device 100 increments a value of a phase ID at predetermined time intervals, and registers a packet ID of a transmitted data packet and a phase ID on the determination table 120a in an associated manner. When the transfer device 100 has received a response packet from the receiving-side transfer device 200, the transfer device 100 determines an unarrived packet on the basis of received packet IDs contained in the received response packet and packet IDs of transmitted data packets. Then, the transfer device 100 determines whether a data packet corresponding to the unarrived packet is lost or on-the-fly from a relationship between a phase ID of the unarrived packet and the maximum phase contained in the received response packet, and retransmits the corresponding data packet only if it is lost. By performing this process, retransmission of a packet corresponding to an on-the-fly data packet can be prevented; therefore, it is possible to prevent wasteful retransmission.

Furthermore, in the retransmission of an unarrived packet, the transfer device 100 can properly determine a packet to be retransmitted without having to set a response delay time or the like.

Moreover, the transfer device 100 determines, out of packet IDs corresponding to phase IDs less than a value of the maximum phase, a packet ID of which the value is different from any of received packet IDs as a packet ID of a data packet to be retransmitted from the determination table 120a. Therefore, whether an unarrived packet is lost or on-the-fly can be properly determined.

Incidentally, in the present embodiment, as an example, the transfer device 100 transmits data packets and a phase packet separately; however, the transfer device 100 can transmit data packets and a phase packet to the transfer device 200 at the same time. For example, a data region in which a phase ID is stored can be provided in a data packet, and the transfer device 100 can store a value of the phase ID data 120c in the region.

Figure 11:
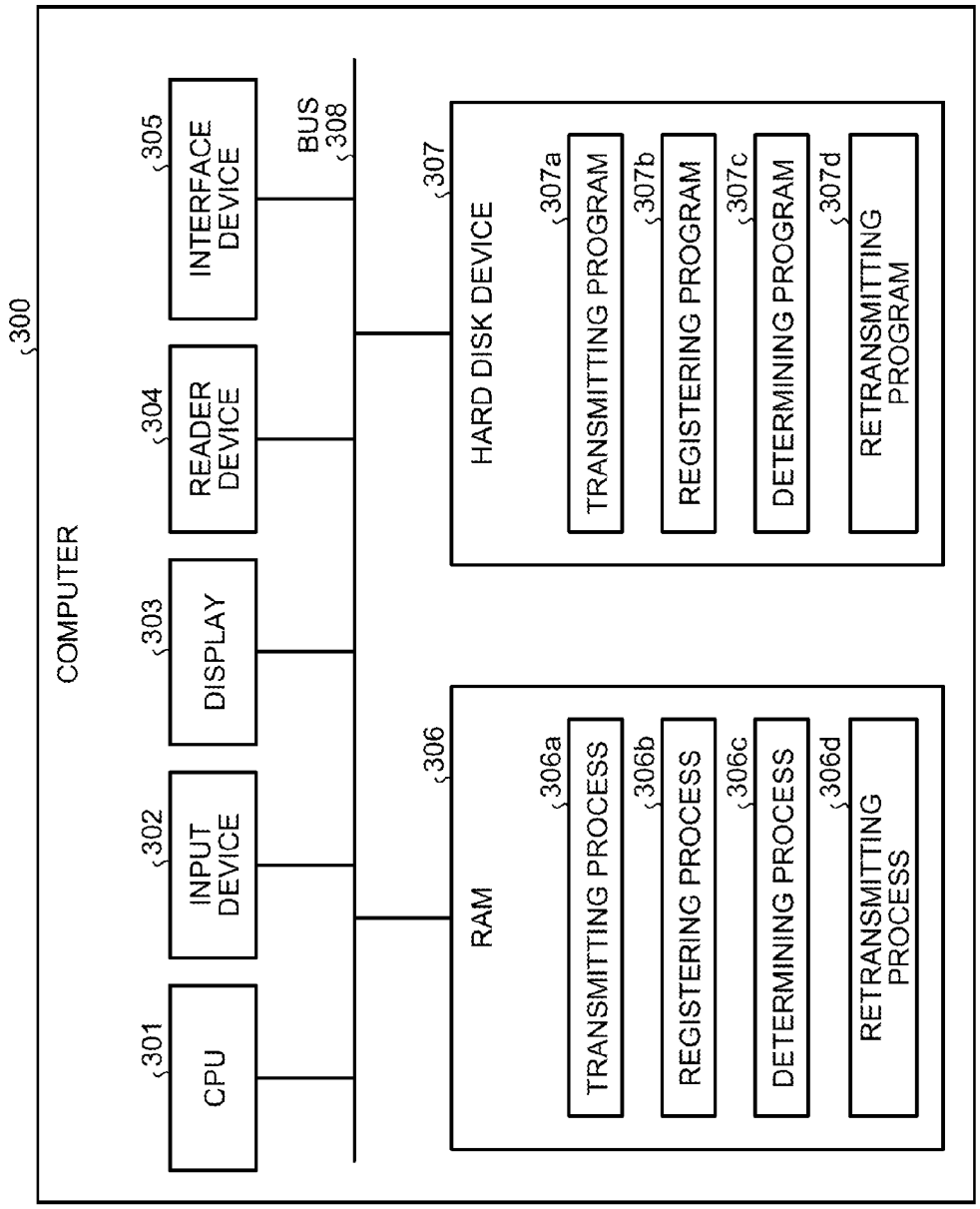
FIG. 11 is a diagram illustrating an example of a computer that executes a transfer program.
Figure 12:
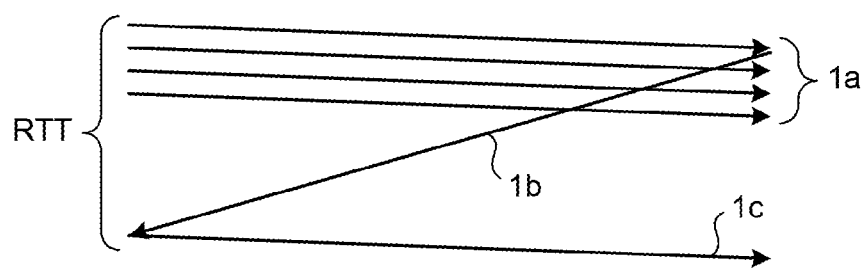
FIG. 12 is a diagram for explaining a conventional technology.
Figure 13:
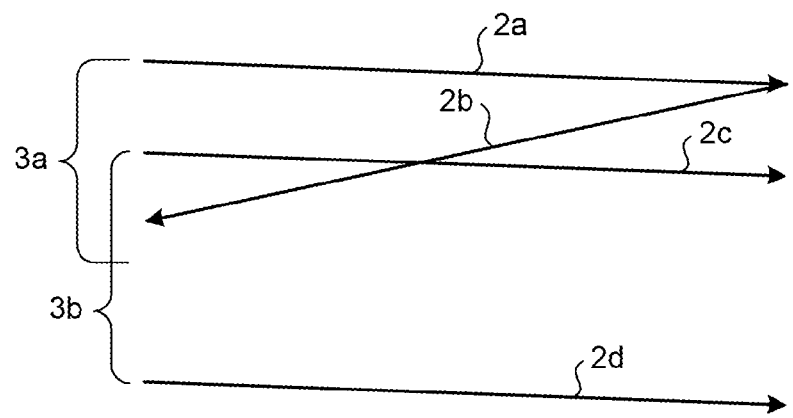
FIG. 13 is a diagram for explaining a conventional technology 1.
Figure 14:
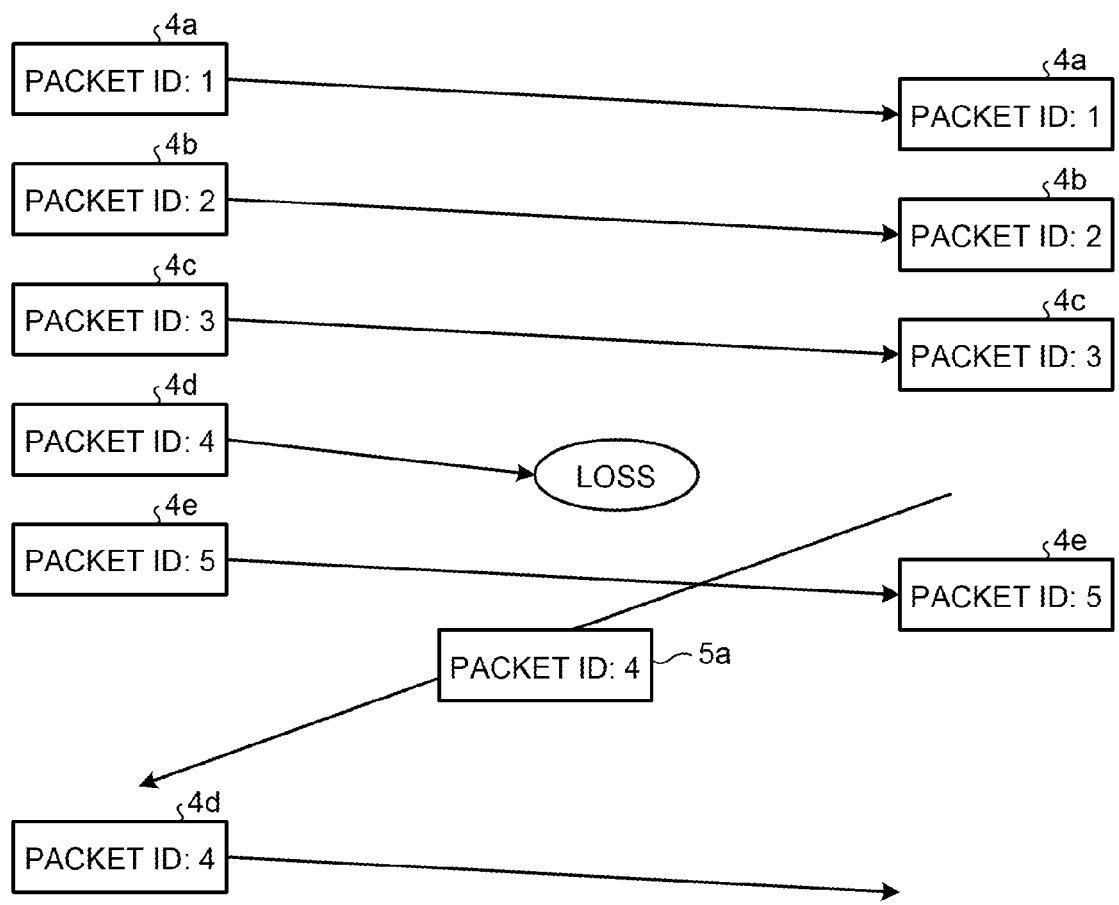
FIG. 14 is a diagram for explaining a conventional technology 2.
Figure 15:
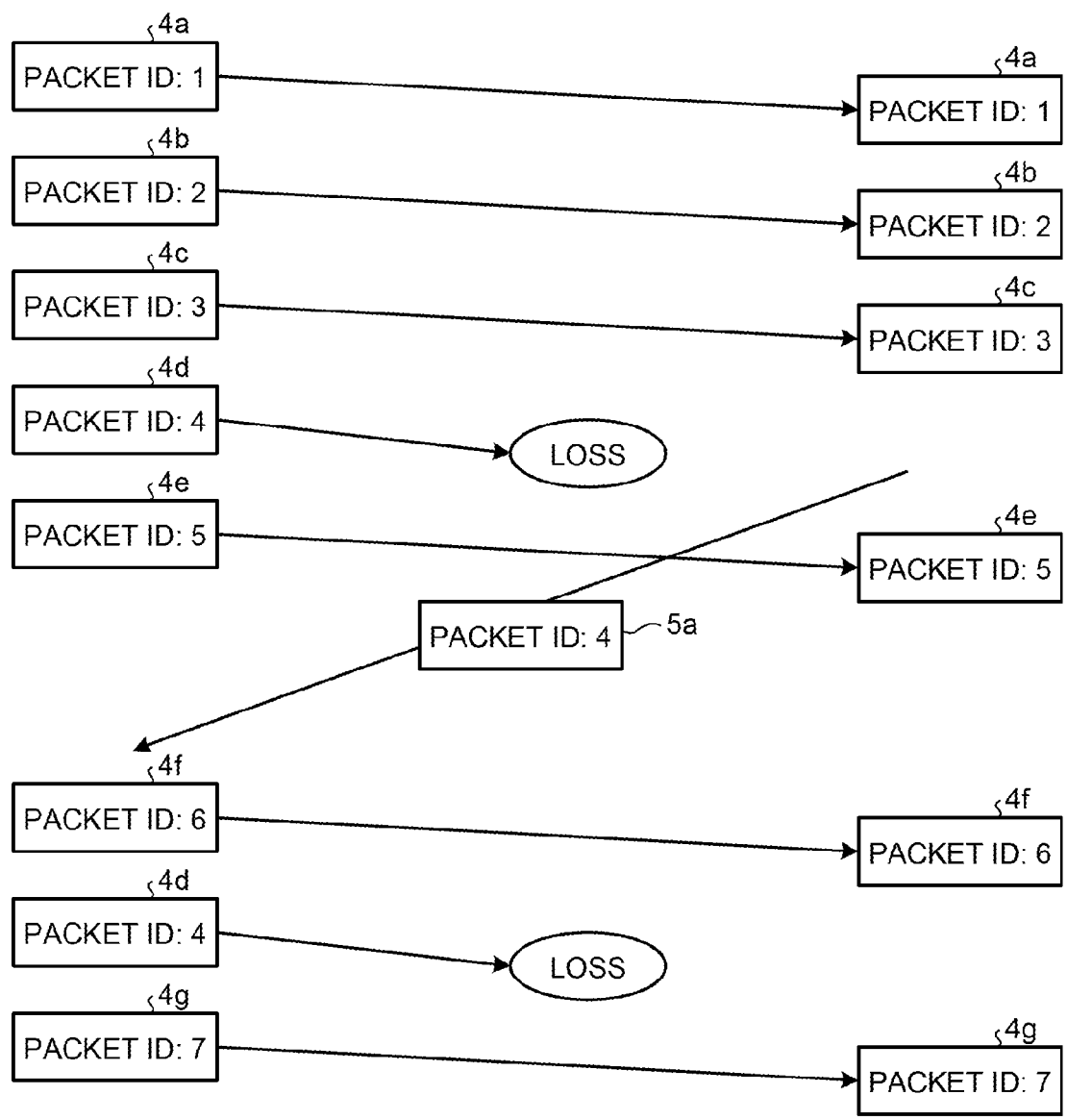
FIG. 15 is a diagram for explaining a problem in the conventional technology 2.

Subsequently, there is explained an example of a computer that executes a transfer program which implements the same function as the transfer device 100 described in the embodiment. FIG. 11 is a diagram illustrating an example of the computer that executes the transfer program.

As illustrated in FIG. 11, a computer 300 includes a CPU 301 which executes various arithmetic processes, an input device 302 which receives data input by a user, and a display 303. The computer 300 further includes a reader device 304 which reads out a program or the like from a storage medium and an interface device 305 which performs data transfer with another computer via a network. The computer 300 still further includes a RAM 306 in which information is temporarily stored and a hard disk device 307. These devices 301 to 307 are connected to a bus 308.

The hard disk device 307 stores therein, for example, a transmitting program 307a, a registering program 307b, a determining program 307c, and a retransmitting program 307d. The CPU 301 reads out these programs 307a to 307d, and loads the programs 307a to 307d into the RAM 306.

The transmitting program 307a functions as a transmitting process 306a. The registering program 307b functions as a registering process 306b. The determining program 307c functions as a determining process 306c. The retransmitting program 307d functions as a retransmitting process 306d.

For example, the transmitting process 306a corresponds to the transmitting unit 132. The registering process 306b corresponds to the registering unit 133. The determining process 306c corresponds to the determining unit 134. The retransmitting process 306d corresponds to the retransmitting unit 135.

Incidentally, the programs 307a to 307d do not necessarily have to be stored in the hard disk device 307 from the beginning. For example, the programs 307a to 307d can be stored in a "portable physical medium" to be inserted into the computer 300, such as a flexible disk (FD), a CD-ROM, a DVD, a magnet-optical disk, or an IC card. Then, the computer 300 can read out the programs 307a to 307d from such a portable physical medium and execute the read programs.

Incidentally, the control units 130 and 230 illustrated in FIGS. 4 and 7 correspond to an integrated device, such as an ASIC (Application Specific Integrated Circuit) or an FPGA (Field Programmable Gate Array). Furthermore, the control units 130 and 230 correspond to an electronic circuit, such as a CPU or an MPU (Micro Processing Unit).

Furthermore, the storage units 120 and 220 illustrated in FIGS. 4 and 7 correspond to a semiconductor memory device, such as a RAM (Random Access Memory), a ROM (Read Only Memory), or a flash memory.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A transfer device comprising:
a transmitting unit that sequentially transmits packets with assigned unique first identification numbers for identifying the packets to a destination, and transmits a second identification number, a value of the second identification number being incremented at predetermined time interval;
a registering unit that registers, within a table, a first identification number of a packet transmitted by the transmitting unit in association with the value of the second identification number at a transmission time of the packet;
a determining unit that receives first identification numbers of packets having arrived at the destination and a most recent value of the second identification number having arrived at the destination, and determines, using the table, a third identification number of a packet to be retransmitted to the destination from the first identification numbers registered within the table that are associated with a value of the second identification number that is less than the most recent value of the second identification number, the third identification number being different from the received first identification number; and
a retransmitting unit that retransmits a packet on the basis of a result of determination by the determining unit.

2. The transfer device according to claim 1, wherein the transmitting unit sequentially transmits the second identification number at a time that the value of the second identification number is incremented, the registering unit registers the first identification number and the associated value of the second identification number in the table each time the packet is transmitted by the transmitting unit, and the first identification numbers received by the determining unit do not include a first identification number which has not arrived at the destination.

3. A transfer method implemented by a computer, the transfer method comprising:
sequentially transmitting packets with assigned unique first identification numbers for identifying the packets to a destination;
transmitting a second identification number, a value of the second identification number being incremented at predetermined time interval to the destination;
registering, within a table, a first identification number of a transmitted packet in association with the value of the second identification number at a transmission time of the packet;
receiving first identification numbers of packets having arrived at the destination and a most recent value of the second identification number having arrived at the destination;
determining, using the table, a third identification number of a packet to be retransmitted to the destination from the first identification numbers registered within the table that are associated with a value of the second identification number that is less than the most recent value of the second identification number, the third identification number being different from the received first identification numbers; and
retransmitting a packet on the basis of a result of the determining.

4. The transfer method according to claim 3, wherein the transmitting sequentially transmits the second identification number at a time that the value of the second identification number is incremented, the registering registers the first identification number and the associated value of the second identification number in the table each time the packet is transmitted by the transmitting, and the first identification numbers received by the receiving do not include a first identification number which has not arrived at the destination.

5. A non-transitory computer-readable medium having stored therein a transfer program causing a computer to execute a process comprising:
sequentially transmitting packets with assigned unique first identification numbers for identifying the packets to a destination;
transmitting a second identification number, a value of the second being incremented at predetermined time interval to the destination;
registering, within a table, a first identification number of a transmitted packet in association with the value of the second identification number at a transmission time of the packet;
receiving first identification numbers of packets having arrived at the destination and a most recent value of the second identification number having arrived at the destination;
determining, using the table, a third identification number of a packet to be retransmitted to the destination from the first identification numbers registered within the table that are association with a value of the second identification number that is less than the most recent value of the second identification number, the third identification number being different from the received first identification numbers; and
retransmitting a packet on the basis of a result of determining.

6. The non-transitory computer-readable medium according to claim 5, wherein the transmitting sequentially transmits the second identification number at a time that the value of the second identification number is incremented the registering registers the first identification number and the associated value of the second identification number in the table each time the packet is transmitted by the transmitting, and the first identification numbers received by the receiving do not include a first identification number which has not arrived at the destination.

* * * * *